US006366356B1

(12) United States Patent
Brosnan et al.

(10) Patent No.: US 6,366,356 B1
(45) Date of Patent: Apr. 2, 2002

(54) HIGH AVERAGE POWER FIBER LASER SYSTEM WITH HIGH-SPEED, PARALLEL WAVEFRONT SENSOR

(75) Inventors: Stephen J. Brosnan, San Pedro; Donald G. Heflinger; Lee O. Heflinger, both of Torrance, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/282,579

(22) Filed: Apr. 1, 1999

(51) Int. Cl.[7] .................................. G01B 9/02
(52) U.S. Cl. .......................... 356/477; 356/484; 372/6
(58) Field of Search ................. 356/477, 484; 372/18, 6, 31, 29, 25

(56) References Cited

U.S. PATENT DOCUMENTS

| | | |
|---|---|---|
| 4,815,079 A | 3/1989 | Snitzer et al. |
| 4,847,477 A * | 7/1989 | Smith .................. 250/201 |
| 5,087,108 A | 2/1992 | Grasso et al. |
| 5,121,460 A | 6/1992 | Tumminelli et al. |
| 5,198,607 A | 3/1993 | Livingston et al. |
| 5,218,665 A | 6/1993 | Grasso et al. |
| 5,291,501 A | 3/1994 | Hanna |
| 5,373,576 A | 12/1994 | Minns et al. |
| 5,461,692 A | 10/1995 | Nagel |
| 5,530,709 A | 6/1996 | Waarts et al. |
| 5,566,196 A | 10/1996 | Scifres |

\* cited by examiner

Primary Examiner—Frank G. Font
Assistant Examiner—Andrew H. Lee
(74) Attorney, Agent, or Firm—Robert W. Keller

(57) ABSTRACT

A high average power fiber-laser system comprises a master oscillator for generating a primary laser signal; a beam splitter array for splitting the primary laser signal into N secondary laser signals; an optical frequency shifter for shifting the frequency of the primary laser signal; a phase modulator array for providing phase compensation of the N secondary laser signals; N single-mode dual clad fiber amplifiers for amplifying the N secondary laser signals and generating an output beam; a beam sampler for sampling the wavefront of the output beam, defining an array of sampled signals; means responsive to the array of sampled signals for interferometrically combining the array of said sampled signals and the shifted primary laser signal into an array of heterodyne optical signals, each having a phase that corresponds to the state of phase of the array of sampled signals; and means responsive to the array of heterodyne optical signals for providing a plurality of feedback signals to the phase modulator array that are linearly proportioned to the state of phase over at least one wave to provide phase compensation of the secondary laser signals. This includes digital dividers for dividing electrical signals by a selected integer and an exclusive OR gate for providing a pulse train having a duty cycle that reflects the phase to be compensated.

12 Claims, 4 Drawing Sheets

HIGH AVERAGE POWER FIBER LASER SYSTEM WITH HIGH-SPEED, PARALLEL WAVEFRONT SENSOR

CROSS REFERENCE TO RELATED APPLICATIONS

This application is related to commonly owned copending application "High Average Power Fiber Laser System With Phase Conjugation", having inventor H. Komine, Ser. No. 09/132,168, filed on Aug. 11, 1998; "High Average Power Solid State Laser With Phase Front Control", having inventor H. Komine, Ser. No. 09/066,063, filed on Apr. 24, 1998; "High Average Power Fiber Laser System With Phase Front Control", having inventor H. Komine, Ser. No. 09/132,178, filed on Aug. 11, 1998, and;

"A Dynamic Optical Micrometer", Ser. No. 09/283,484, now U.S. Pat. No. 6,243,168, having inventors Donald Heflinger and Lee Heflinger, "A Dynamic Optical Phase State Detector", Ser. No. 09/289,946, now U.S. Pat. No. 6,147,755, having inventors Donald Heflinger and Lee Heflinger, and "Heterodyne Wavefront Sensor", Ser. No. 09/283,604, now U.S. Pat. No. 6,229,616, having inventors Stephen Brosnan, Donald Heflinger and Lee Heflinger, filed concurrently with this patent application.

BACKGROUND OF THE INVENTION

1. Field of the Invention

The present invention generally relates to a high-average-power fiber laser system, and more particularly such a system that includes a high speed parallel wavefront.

2. Description of the Prior Art

High power laser weapon systems are generally known in the art. An example of such a high power laser system is disclosed in commonly owned U.S. Pat. No. 5,198,607. Such laser weapon systems normally include a high power laser weapon and a tracking system for locking the high power laser on a target, such as a ballistic missile, cruise missile, bomber or the like. Such laser weapons are used to destroy or "kill" such targets.

Such laser weapon systems are known to employ relatively large chemical lasers. However, such chemical lasers have several drawbacks. For example, such chemical lasers are relatively bulky and require special fuels that create logistic difficulties for field deployment. As such, a need has developed to provide relatively efficient compact laser weapons that can operate from electrical generators. Unfortunately, the power output level of known fiber laser systems, which are relatively compact and efficient is heretofore been insufficient for use in laser weapon systems. Such fiber lasers are known to include a dual-clad optical fiber. More particularly, the optical fiber includes a core, for example formed from $SiO_2$ and doped with a rare earth ion, such as, Yb or Nd, Er or other rare earth ions. The doped core is clad by two different cladding layers having different indices of refraction to cause the total internal reflection of the light within the optic fiber to form a single mode fiber. Examples of such optical fibers used for fiber laser are disclosed in U.S. Pat. Nos. 4,815,079; 5,087,108; 5,218,665; 5,291,501; 5,461,692; 5,530,709; and 5,566,196. Such fiber lasers are known to be diode pumped and generate relatively low average power levels, for example, up to 35 watts at a light-to-light efficiency of about 70 %. Unfortunately, such relatively low power levels of fiber lasers have made them unsuitable for many applications including defense applications.

Various attempts have been to increase the average power output of such fiber lasers. Examples of such attempts are disclosed in U.S. Pat. Nos. 5,121,460 and 5,373,576. Such attempts generally involve the use of relatively complex optical fibers. For example, the '460 patent teaches the use of an optical fiber having a neodymium doped primary core surrounded by a first elliptically shaped multi-mode cladding of fused silica. A samarium doped secondary core is formed around the primary core within the first layer of cladding. The secondary core is utilized for suppressing higher order modes.

The '576 patent also discloses the use of a relatively high average power optical fiber. More particularly, the '576 patent discloses an optical fiber formed, with a doped core surrounded by a first multi-mode cladding layer formed from, for example, fused silica. A second cladding layer is formed around the first cladding layer and formed from a cross-link polymeric material having a liquid component. The optical fibers disclosed in the '460 and '576 patents are relatively complex. Thus, there is a need for a relatively high average power fiber laser that utilizes relatively less complex optical fibers than known systems.

The limitations in obtaining high optional powers from a single optical fiber has directed attention to using an array of low power optical fibers that are coherently coupled so as to deliver a well collimated high average power beam with a controlled phase front. To control the phase front of this high power beam, the optical phase in each individual emitting fiber in the array needs to be sampled and actively controlled. Current art for performing this phase front detection is provided by existing wavefront sensors. However, the existing wavefront sensors operate in ways that limit their application to detecting and actively controlling the phase front of a high average power optical fiber array.

Current art is limited by the speed of the camera used in the wavefront sensor that measures the two-dimensional state-of-phase of the output beam. Such cameras are usually read out serially, which imposes a bottleneck in the phase measurement speed. Another limitation involves an ambiguity in the phase measurement that uses an interferometer. The ambiguity can only be resolved by the addition of more components, storing intermediate data, and making computations with that data. The computation bottleneck is a serious limitation to the phase measurement throughput.

What is needed, therefore, is a high speed wavefront sensor to sample the wavefront and actively control the state of phase of each individual optical fiber in a high average power fiber laser array.

SUMMARY OF THE INVENTION

Briefly, the present invention relates to an improved relatively high average power fiber laser system with a high-speed, parallel wavefront sensor.

DESCRIPTION OF THE DRAWINGS

These and other advantages of the present invention will be readily understood with reference to the following specification and attached drawings wherein.

DETAILED DESCRIPTION

Figure 1:
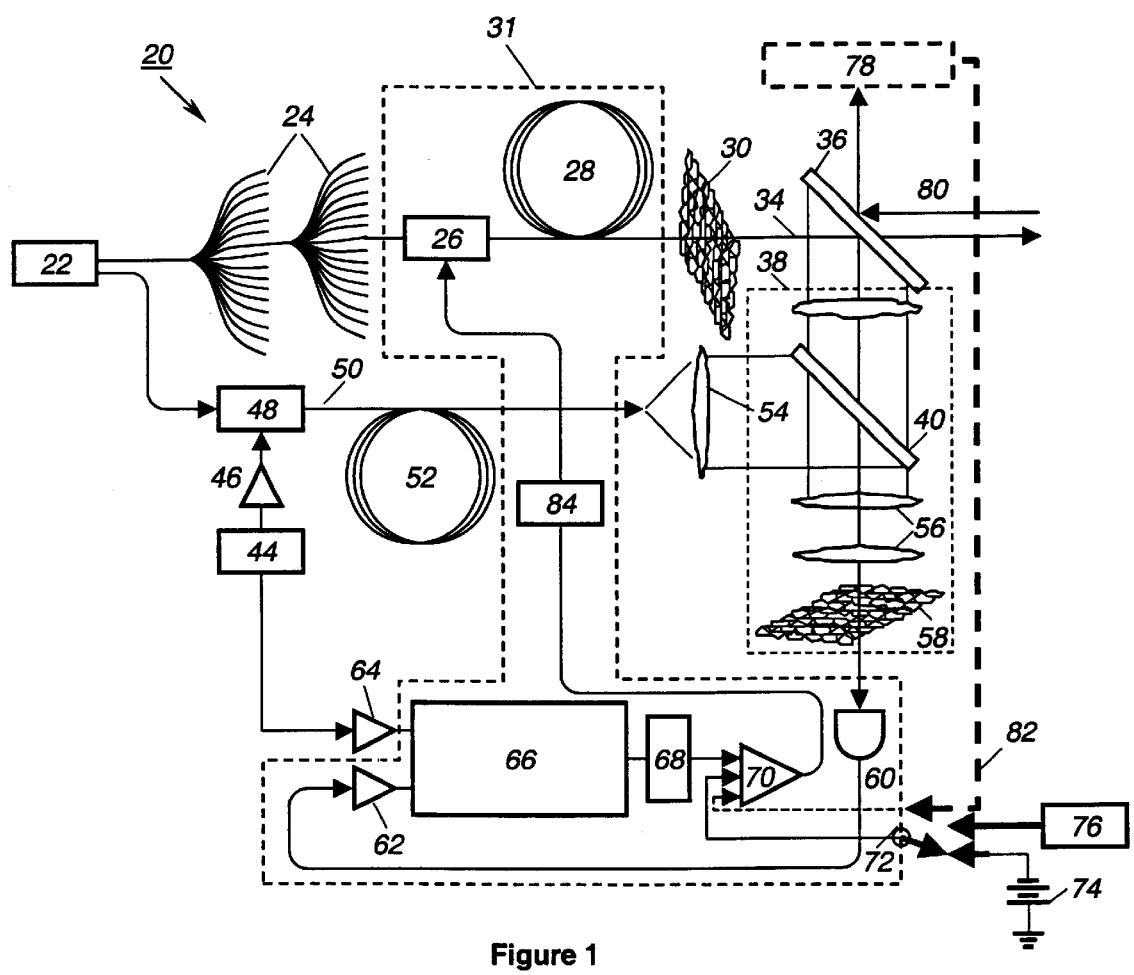
FIG. 1 is a block diagram of the improved high average power laser system with a high-speed, parallel wavefront sensor in accordance with the present invention.

The present invention relates to an improved high average power fiber laser system with a high speed, parallel, wavefront sensor as illustrated in FIG. 1 and generally identified with the reference numeral 20. Known diode pumped, dual clad, ytterbium-doped glass fiber lasers are known to generate up to 35 watts of power in a single mode fiber at a light-to-light efficiency of about 70 %. In order to provide relatively higher average power, the system 20 in accordance with the is present invention utilizes a plurality of parallel fiber amplifiers, for example, diode pumped dual clad fiber amplifiers connected to a common master oscillator. The dual clad fiber amplifiers with single-mode cores can generate diffraction-limited beam output. Fibers of slightly different length can lead to differences in the optical phase of the output beam. An array of such beams produce poor beam quality. This problem is solved by providing each amplifier with independently controlled adjustable phase modulators. These phase modulators are used to compensate for the relative optical phase shifts among the array of fiber amplifiers. The phase modulators may be disposed on the input side of the fiber amplifiers to provide precompensation of the phase shifts due to the fiber amplifiers. This array of radiation emitted by the fiber amplifiers with individual phase modulators is analogous to a synthetic aperture radar operating at radio and microwave frequencies. The present invention operates in the optical frequencies.

Turning to FIG. 1, a high-average-power fiber-laser system 20 includes a master oscillator 22, formed, for example, from a single mode fiber laser, for example, a Model PYL Series single-mode laser, by the IRE-POLUS GROUP. The master oscillator 22 provides a primary laser signal. The primary laser light from the master oscillator 22 is directed to beam splitter array 24. The beam splitter array 24 may consist of a plurality of fiber beam splitters, which divides the primary laser signal from the master oscillator 22 into a plurality of secondary laser signals, for example, N secondary laser signals as shown. The number of beam splitters in the beam splitter array 24 is dependent upon the number of dual clad fiber amplifiers in the system. An important aspect of the invention is that the number of fiber amplifiers can be varied to provide a scaled laser output beam. In the preferred embodiment 32×32 or 1024 secondary laser signals are developed. For simplicity only a single secondary laser signal path is illustrated. It is understood that there are as many paths as there are secondary laser signals. The portion of the diagram that is duplicated for each of the paths is enclosed by the dotted line marked 31.

The secondary laser signals from the beam splitter array 24 are directed to a phase modulator array 26. As mentioned above, the phase modulator array provides for precompensation of the secondary laser signals to compensate for the relative optical phase shifts in fiber amplifiers. As will be discussed in more detail below, the phase modulator array 26 can consist of a fast spatial light modulator (SLM) or in-line fiber phase modulators.

In each path a diode pumped dual-clad single-mode fiber amplifier 28 follows the phase modulator. Such dual-clad single-mode fiber amplifiers are known to provide significantly higher output power with single-mode output compared to conventional single-mode fibers. The pumped inner cladding region in such dual-clad fibers can be made relatively larger than the single mode core to facilitate greater pump power coupling at the ends of the fiber.

The precompensated secondary laser signals from the phase modulator array 26 may be collimated by a lens array 30. The lens array 30 consists of N×N parallel lenses used for collimating the precompensated secondary laser signals from the phase modulator array 26 into a plurality of N×N fiber amplifiers 28. Each fiber amplifier 28 is associated with a lens from the lens array 30, and an individually adjustable phase modulator from the phase modulator array 26 for controlling the optical phase of an individual secondary laser beam from the beam splitter array 24. The lens array 30 is an optical component in which is N×N small, identical lenses are fabricated on a transparent substrate, arranged in rows and columns of a precisely aligned, two-dimensional grid. Such components are commercially available, for example, from Micro-Electro-Mechanical Systems, Huntsville, Ala. and Meadowlark Optics, Longmont, Colo.

The collection of the phase compensated beams collimated by the lens array 30 form the output beam 34. To achieve phase compensation the wavefront of the output beam 34 must be measured and used to supply feedback signals to the phase modulator array 26. The function of this feedback loop will be described next.

Beam sampler 36 reflects a portion of the output beam 34 to a wavefront sensor, whose first element is an interferometer 38 as shown in dashed lines. The light from two arms of the interferometer are combined by beamsplitter 40. The light in the reference arm is prepared as follows. A radio frequency (RF) oscillator 44 generates an RF fixed frequency electrical signal which is applied through an amplifier or RF driver 46 to an optical frequency shifter 48. Preferably, the RF signal is a sinusoidal signal at 40 MHz, but any fixed RF frequency may be utilized. The optical frequency shifter 48 serves to shift the optical frequency of the optical reference wavefront from master oscillator 22 by an amount of frequency corresponding to the RF. In the preferred embodiment, the optical frequency shifter 48 is an acousto-optic modulator. The optical frequency shifter 48 also produces a zero order unshifted beam in such devices, but this is not used in this embodiment.

The frequency shifted beam 50 is coupled to a passive reference optical fiber 52. The optical fiber has a predetermined length such that the optical path lengths of the two legs of the interferometer are equal. This condition assures that interference contrast of the light in the two arms is high. The required accuracy of the path length matching depends upon the optical frequency bandwidth $\Delta v$ of the laser beam. The paths must be matched to within some small fraction (nominally 20 %) of the length $c/(n \Delta v)$, where c is the speed of light and n is the refractive index of the fiber (approximately 1.45). For example, if the bandwidth is 1 GHz then the paths must be matched to within 4 centimeters.

The optical fiber 52 carries the shifted reference beam to its open end where a free-space beam is radiated and expanded outwardly, to be collimated by a lens 54. Thus, a plane wave reference beam that has a uniform phase across its two dimensional aperture and is shifted in frequency by an amount corresponding to the RF is developed.

A beam combiner 40 interferes the light from the frequency shifted reference wavefront and the sampled output optical wavefront 34. The optical interference between the wavefronts performs a heterodyne of these two optical frequencies, which generates a heterodyne optical signal at the beat frequency representative of the RF modulation frequency from the RF oscillator 44.

A telescopic lens arrangement 56 forms an image of the heterodyned light at the plane of the beam combiner 40 at the plane of the lens array 58. As previously described, the array has dimensions of N×N. Each lens corresponds to a subaperture or pixel of the output optical wavefront 34 and gathers the heterodyne optical signal for that pixel into a respective photodetector of an N×N photodetector array 60. Each photodetector in the 60 responds to the intensity variations of the heterodyned optical signal, thereby generating the RF beat frequency signals. The phase of each of the detected RF beat frequencies relative to the original RF modulation signal contains the phase information of the corresponding subaperture of the output optical wavefront.

Amplifier 62 conditions the heterodyne electrical signal from each photodetector 60 of the photodetector array. Amplifier 64 conditions a reference electrical signal from the RF oscillator 44. Signals are directed to the heterodyne signal processor 66. Processor 66 serves to transform the sinusoidal waveforms from the frequency reference source 44 and from each of the respective N×N sinusoidal photodetector waveforms into N×N pulse trains whose respective duty cycles are proportional to the sampled optical phase. Two possible embodiments of the heterodyne signal processor 66 will be described later.

The duty-cycle pulse trains are electronically integrated by low pass filters 68, which after some time develop DC voltages that are proportional to the N×N duty cycles and consequently to the sampled N×N optical phases. Preferably, the filter 68 is a conventional resistor capacitor integrator circuit whose time constant must be (1) much greater than the digital-divided square-wave period, and (2) less than the minimum time over which the measured optical phase changes.

In preparation for closing the phase control feedback loop a set-point voltage must be provided by some source and is summed with the sample voltage at summing amplifier 70. The set-point is a necessary feature of a feedback controlled system which determines the quiescent state of phase to which the phasefront is to be locked. This set-point voltage is in general distinct for each feedback signal path and allows the flexibility of complete optical phasefront control. One of several options for the pixel set-point voltages may be selected, as shown symbolically by the switch 72. In one embodiment a constant DC voltage source 74 provides the same set-point voltage 74 for all paths of the array. This results in the compensation for phase differences among the N×N fiber amplifier paths and a uniform output-beam phasefront.

Also, providing an input to the summing amplifier 70 is an external source, such as a computer, 76 with N×N digital-to-analog channels. This supplies a distinct set-point voltage for each path, thereby allowing complete control of the output beam phasefront. This introduces the capability for output beam steering or focusing.

A third input to summing amplifier 70 is provided by the output beam phasefront from a wavefront sensor 78. This is specified to allow a distortion-free beam to arrive on target after propagation through a distorting atmosphere. This is accomplished with the addition of the wavefront sensor 78 to measure the phasefront of an incoming beacon wave 80. The beacon light 80 may originate from a laser from a cooperative target or it may be light reflected from a small portion of the target's surface. To function in this application the wavefront sensor must have a sufficiently short response time to measure atmospheric propagation phases. It is preferred that the sensor 78 have N×N pixels and have the same field of view as the fiber array output beam. Some fraction of the beacon light is reflected by beamsplitter 36 to the beacon wavefront sensor 78. The N×N wavefront sensor output voltages 82 are supplied to the set point inputs of the summing amplifier 70.

In the preferred embodiment the wavefront sensor 78 is one described in the copending patent application, Ser. No. 09/203,604, "Heterodyne Wavefront Sensor", filed concurrently with the present application. This patent application is incorporated herein by reference.

The output of each summing amplifier 70 is applied to a phase modulator driver 84, which determines the phase shift imposed by phase modulator 26, thereby closing the feedback loop. As mentioned above, the phase modulator array may utilize a fast spatial light modulator (SLM). Spatial light modulators are known in the art. Meadowlark Optics of Longmont, Colo., is a manufacturer of such spatial light modulator devices. An SLM consists of a two dimensional array of individually addressable elements or pixels that have an electrically variable transmitted optical phase. The array allows the control of the optical phases of the array of fiber amplifiers 28, including the creation of a conjugate phase front.

Figure 2:
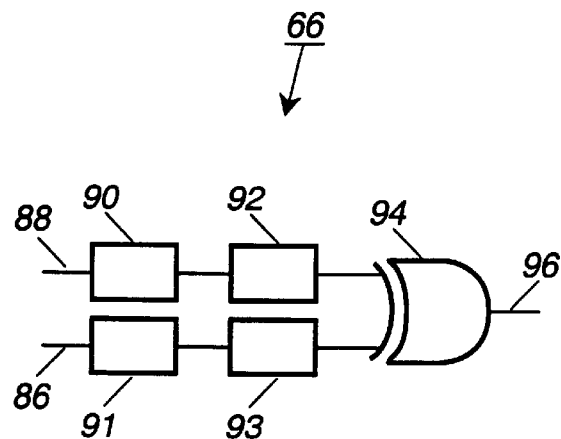
FIG. 2 is a block diagram of a first embodiment of a of heterodyne signal processor in accordance with the present invention.

The heterodyne signal processor 66 may be fabricated in a number of ways. One embodiment is shown as the electronic circuit block diagram of FIG. 2. Both the reference signal on line 86 and each of the N×N sample signals (one example is shown as line 88) are converted to respective square waves by circuits 90 and 91, which can be Schmidt triggers. The resulting pulse trains are input to circuits 92 and 93, respectively, which perform digital division by the integer factor M. The division converts a pulse train with period 1/f into a pulse train with period M/f. In the preferred embodiment, digital dividers that divide by a power of 2 are chosen due to their ease of availability. They are manufactured by Fairchild Corporation and designated as Model 74F74. The logical exclusive-or operation is then performed by an exclusive OR circuit 94 on the reference pulse train with each of the N×N sample pulse trains. This operation converts the relative phase between the reference and respective sample pulse train into a pulse train on output 96 whose duty cycle is proportional to the respective sampled optical phase.

Figure 3:
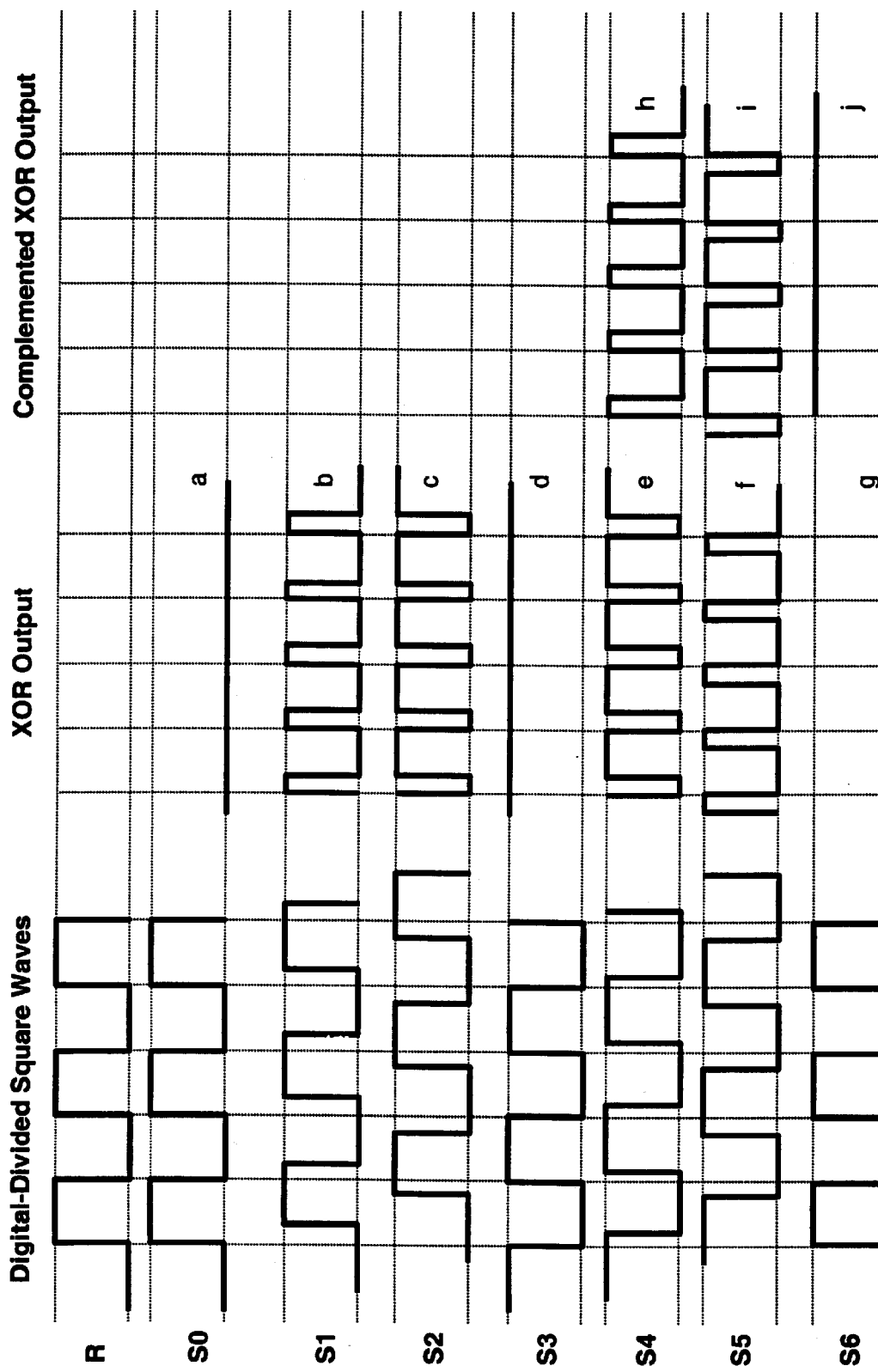
FIG. 3 is a timing diagram for the heterodyne signal processors illustrated in FIGS. 2 and 3.

FIG. 3 shows timing diagrams for the heterodyned detected RF beat frequency electrical signal appearing at the output of amplifier 92 and the reference RF modulator signal appearing at the output of amplifier 93 as they are processed through exclusive-OR (XOR) circuit 94. The left column shows the reference digital-divided RF square-wave signal in FIG. 3R. In subsequent rows of FIG. 3, labeled S0, S1, S2, S3 S4, S5, and S6, the signal digital-divided square-waves appearing at the output of amplifier 62 are shown for increasing values of relative phase. The second column of FIG. 3 shows the corresponding duty-cycle pulse train waveform at the output of the exclusive-OR circuit 96. Note that the signal square wave slips to the right as the phase in increased. The duty-cycle of the waveform in the second column of FIG. 3 grows linearly as the phase increases from 0 to $M\pi$ in the progression from FIG. 3 rows S0 to S3, where the maximum (equaling 1) duty cycle is reached. As the phase continues to increase from $M\pi$ to $2M\pi$ during the sequence S4 to S6 the duty cycle decreases linearly from the maximum to zero. This trend is shown explicitly in the triangular response curve of FIG. 4, where the letter labels shown for waveforms in the second column of FIG. 3 also designate points on the response curve of FIG. 4.

Figure 4:
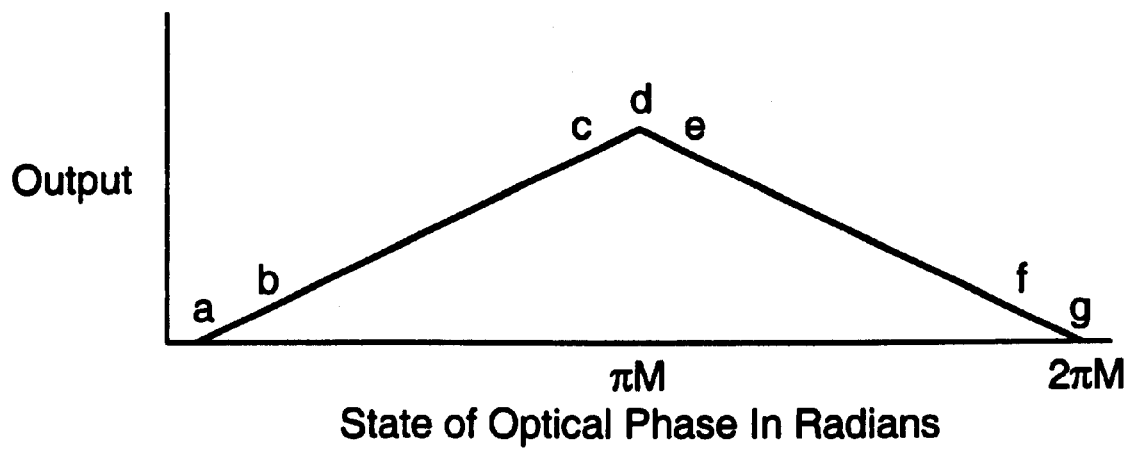
FIG. 4 is an output response for the heterodyne signal processor shown in FIG. 2.
Figure 5:
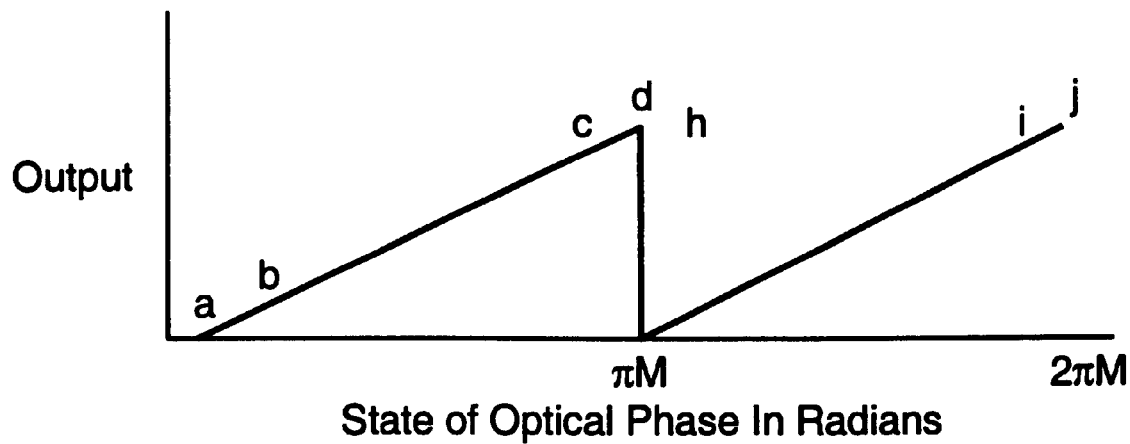
FIG. 5 is an output response for the heterodyne signal processor shown in FIG. 6.

The voltage response of the heterodyne signal processor 66 versus optical phase is shown in FIG. 4 to be of triangular form. Although this is usable for most applications, it is, however, not suited to the application of a phase controlled fiber amplifier array for the following reason. The phase variations between fibers can exceed many optical waves, but only $2\pi$ radians of optical phase are needed to allow phase correction for propagation. Therefore, any phase correction should be modulo $2\pi$. More particularly the problem with the triangle wave output is based on the fact that it cannot support modulo $2\pi$. But consider the following. By letting M be 2 (a single flip-flop division) the positive going slope spans exactly $2\pi$ radians of phase shift. The problem stems from the fact that if the output exceeds a peak (or a valley) of the triangle wave then the slope of the output has changed signs. The loop that previously made the proper corrections to the phase to serve on a set point will now be driven by an increasing error signal as the correction is attempted. This error in setting the phase will drive the phase even further onto the negative slope region. If the phase could support another complete $2\pi$ phase change, the error signal would correctly drive the phase all the way down the slope of the triangle wave and cross the valley (or peak) to return to a positive slope where the error signals give proper feedback. This means that the optimum voltage response versus optical phase should have a sawtooth form as in FIG. 5. Thus, the solution to this problem is to make all slopes positive which is what the saw tooth output achieves.

Figure 6:
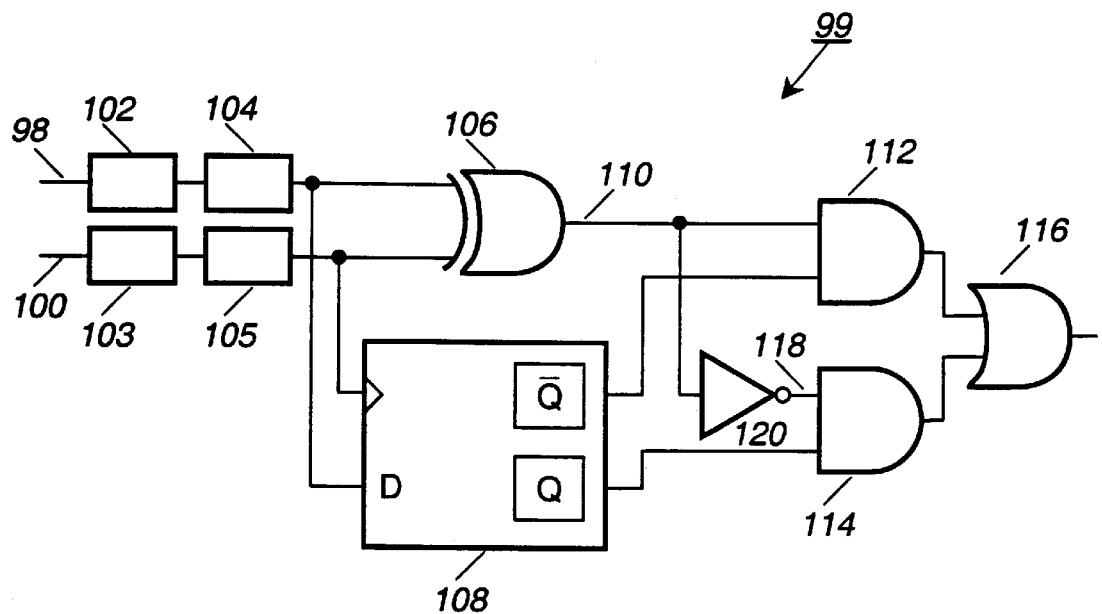
FIG. 6 is a block diagram of a second embodiment of a heterodyne signal processor in accordance with the present invention.

An alternative embodiment of the heterodyne signal processor 99 is shown in FIG. 6. It is similar to the processor 66, but includes the addition of an edge-triggered D flip-flop to enable a choice of either the original duty-cycle waveform, such as provided by the processor 66, or its complement. A decision circuit 108 is added to test whether the sample phase is in the range 0 to $M\pi$ radians or the range $M\pi$ to $2M\pi$, where M is the integer digital division factor. In the first range the original duty-cycle waveform is chosen. In the second range the complement waveform is chosen.

The heterodyne signal processor 99 shown in FIG. 6 contains several elements to the processor 66 and like numerals indicate such elements. The signal heterodyne sinusoidal wave on line 98 and the reference heterodyne sinusoidal wave on line 100 are input to respective Schmidt trigger circuits 102 and 103. The digital division circuits 104 and 105 operate identically to the circuits 92 and 93, as does the exclusive-OR circuit 106 to XOR 94. A decision circuit is added in the form of a conventional edge-triggered D flip-flop 108. The reference pulse train from digital divider 105 is fed to the clock input. At each positive transition of the clock the state of the sample pulse train is latched. If the sample is low at the time of the clock edge then the sample phase is in the range from 0 to $M\pi$ radians, and the Q and Qbar outputs are set to select the original duty-cycle pulse train on line 110. The selection is made through the AND gates 112 and 114 and the OR gate 116. Conversely, if the sample is high at the time of the clock edge, then the sample is in the range from $M\pi$ to $2M\pi$ radians, and the Q and Qbar outputs are set to select the complemented duty-cycle pulse train on line 118 which is provided by an inverter 120.

The timing diagrams shown in FIG. 3 demonstrate the operation. The waveforms are as described above, with the addition that the third column shows the complemented XOR waveforms for the signal sequence S4 to S6, corresponding to the signal phase range from $M\pi$ to $2M\pi$ radians. Due to the decision circuit, the complemented XOR duty-cycle waveform is chosen in this case and the output duty-cycle waveform as the phase is changed from 0 to $2M\pi$ radians follows the progression of curves labeled a, b, c, d, h, i, and j. These letter labels show the corresponding points on the response curve shown in FIG. 5. As has been described the response curve is the output of the integrator 68. Hence, the curve has the desired sawtooth shape, thereby assuring that the phase response of the sensor be modulo $2\pi$.

The system 20 illustrated in FIG. 1 forms a high average power fiber laser system with wavefront compensation. In addition to being compact and efficient, the high average power fiber laser system 20 provides a high-speed, parallel wavefront sensor and a scalable power output with phase front control, useful in applications where the power level requirements vary and where beam aberration correction enhances the system performance.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A high average power fiber laser system comprising:
   a master oscillator for generating a primary laser signal;
   a beam splitter array for splitting said primary laser signal into a reference laser signal and N secondary laser signals where N is a positive integer;
   an optical frequency shifter for shifting the frequency of the reference laser signal;
   a phase modulator array for providing phase compensation of said N secondary laser signals;
   N single-mode dual clad fiber amplifiers for amplifying said N secondary laser signals and generating an output beam;
   a beam sampler for sampling the wavefront of said output beam, defining an array of sampled signals;
   means responsive to said array of sampled signals for interferometrically combining said array of sampled signals and the shifted reference laser signal into an array of heterodyne optical signals, each having a phase that corresponds to the state of phase of the array of sampled signals; and
   means responsive to said array of heterodyne optical signals for providing a plurality of feedback signals to said phase modulator array that are linearly proportional to the state of phase over at least one wave to provide phase compensation of said secondary laser signals.

2. A high average power fiber laser system as set forth in claim 1, and further comprising means for generating a radio frequency (RF) signal, and wherein said optical frequency shifter responds to said RF signal for shifting the frequency of the primary laser signal by the RF frequency.

3. The high average power fiber laser system as set forth in claim 2, wherein said means responsive to said array of heterodyne optical signal includes an array of elements, each responsive to a subaperture of said heterodyne optical signals and operative to produce an electrical signal at the optical beat frequency corresponding to the RF and having a phase corresponding to the phase to be compensated, and
   means responsive to the RF signal and said array of electrical signals and operative to develop said plurality of feedback signals, each corresponding to the compensated phase, and wherein said means responsive to said RF signal and said electrical signal includes a first digital divider and a second digital divider, said digital dividers serving to divide the RF frequency of said RF signal and said electrical signal respectively, and circuit means responsive to the divided RF signal and the divided electrical signal and operative to produce one of said feedback signals.

4. The high average power fiber laser system as set forth in claim 3, wherein said digital dividers serve to divide the RF frequency of said RF signal and said electrical signal by M, where M is any integer.

5. The high average power fiber laser system as set forth in claim 3, wherein said circuit means includes an exclusive OR gate for providing a pulse train having a duty cycle that reflects the relative phase between the divided RF signal and the divided electrical signal and a filter circuit for developing one of said feedback signals.

6. The high average power fiber laser system as set forth in claim 3, wherein said means responsive to said RF signal and said electrical signal includes a first means for converting said RF signal into a first square wave pulse train and for applying said first square wave pulse train to said first digital divider and a second means for converting said electrical signal into a second square wave pulse train and for applying said second square wave pulse train to said second digital divider.

7. The high average power fiber laser system as set forth in claim 3, wherein said feedback signal has an increasing magnitude over the optical phase up to the product of $\pi$ radians and the divisor of the said digital dividers.

8. A high average power fiber laser system as set forth in claim 5, and further comprising a decision circuit coupled across said exclusive OR gate for producing a complementary pulse train when the optical phase is in the range from $M\pi$ to $2M\pi$ radians, where M is the integer digital divider factor.

9. A high average power fiber laser system as set forth in claim 8, wherein said feedback signals each have a sawtooth waveform.

10. A high average power fiber laser system as set forth in claim 5, and further comprising a plurality of summing amplifiers, each responsive to a feedback signal and a constant voltage and operative to provide the same set-point voltage to each phase modulator in said phase modulator array.

11. A high average power fiber laser system as set forth in claim 5, and further comprising a control computer for delivering a plurality of distinct set-point voltages and a plurality of summing amplifiers, each responsive to a feedback signal and one of said distinct set-point voltages and operative to provide the appropriate set-point voltage to each phase modulator so as to control the output beam.

12. A high average power fiber laser system as set forth in claim 5, and further comprising a wavefront sensor, said wavefront sensor responsive to an incoming beacon beam and operative to supply a plurality of sensor voltages, and a plurality of summing amplifiers each responsive to a feedback signal and a sensor voltage and operative to provide the appropriate phase compensating signal to each phase modulator so as to control the output beam.

* * * * *